(12) United States Patent
Fay, II et al.

(10) Patent No.: US 12,543,651 B2
(45) Date of Patent: Feb. 10, 2026

(54) HEADER CONDITIONING ROLL SYSTEM FOR AN AGRICULTURAL HARVESTING MACHINE

(71) Applicant: CNH Industrial America LLC, New Holland, PA (US)

(72) Inventors: Jeffrey Fay, II, Oxford, PA (US); Kevin Cordes, Glenmoore, PA (US); Kevin Hanson, Akron, PA (US); Samuel Anderson, Emlenton, PA (US)

(73) Assignee: CNH Industrial America LLC, New Holland, PA (US)

( * ) Notice: Subject to any disclaimer, the term of this patent is extended or adjusted under 35 U.S.C. 154(b) by 460 days.

(21) Appl. No.: 18/201,957

(22) Filed: May 25, 2023

(65) Prior Publication Data
US 2024/0389510 A1  Nov. 28, 2024

(51) Int. Cl.
*A01D 82/02* (2006.01)
*A01D 43/10* (2006.01)
*A01D 82/00* (2006.01)

(52) U.S. Cl.
CPC ........... *A01D 82/02* (2013.01); *A01D 43/102* (2013.01); *A01D 43/105* (2013.01); *A01D 82/00* (2013.01)

(58) Field of Classification Search
CPC ...... A01D 82/00; A01D 82/02; A01D 43/102; A01D 43/105; A01D 75/187; A01D 41/127
See application file for complete search history.

(56) References Cited

U.S. PATENT DOCUMENTS 3,613,336 A * 10/1971 Smith .................. A01D 61/004
56/192
4,546,599 A  10/1985 Cicci et al.
(Continued)

FOREIGN PATENT DOCUMENTS

DE   10030505 A1   1/2002
EP    0970597 B1   4/2004
(Continued)

OTHER PUBLICATIONS

The Extended European Search Report issued Oct. 25, 2024, by the European Patent Office in corresponding European Patent Application No. 24177832.3 (13 pages).

*Primary Examiner* — Brad Harcourt
(74) *Attorney, Agent, or Firm* — Buchanan Ingersoll & Rooney PC

(57) ABSTRACT

An agricultural crop conditioner comprising: a frame; first and second conditioner rolls with the second conditioner roll being movable towards and away from the first conditioner roll to change a size of a gap between the rolls; a tensioner configured to generate closing force component to bias the second conditioner roll in the closing direction; a conditioner roll drive circuit; and a hydraulic actuator. The conditioner roll drive circuit has a hydraulic pump and motor to drive at least one of the conditioner rolls. The hydraulic actuator is configured to convert pressure from hydraulic fluid in the reverse supply line into an opening force to bias the second conditioner roll away from the first conditioner roll. The opening force is less than the closing force when the pump is operated in a forward direction, and greater than the closing force when the pump is operated in a reverse direction.

15 Claims, 4 Drawing Sheets

(56) References Cited

U.S. PATENT DOCUMENTS

| | | | |
|---|---|---|---|
| 5,020,579 A * | 6/1991 | Strong | B27B 25/02 |
| | | | 241/34 |
| 5,845,469 A | 12/1998 | Koom | |
| 6,397,570 B1 * | 6/2002 | Bohrer | A01D 75/187 |
| | | | 56/10.2 J |
| 6,584,755 B2 * | 7/2003 | Holtkotte | A01D 43/085 |
| | | | 56/60 |
| 6,810,649 B2 | 11/2004 | Kempf | |
| 6,996,961 B2 | 2/2006 | Nickel et al. | |
| 7,467,505 B2 | 12/2008 | MacGregor | |
| 7,730,701 B1 | 6/2010 | Ehrhart et al. | |
| 8,006,470 B2 | 8/2011 | Pruitt et al. | |
| 8,056,309 B2 | 11/2011 | Vandendriessche | |
| 9,179,600 B2 * | 11/2015 | Kraus | A01D 41/127 |
| 9,648,809 B2 | 5/2017 | Pruitt et al. | |
| 10,506,762 B2 | 12/2019 | Glade et al. | |
| 10,806,078 B2 | 10/2020 | Rotole et al. | |
| 11,089,728 B2 | 8/2021 | Wire et al. | |
| 11,477,941 B2 | 10/2022 | Mortensen | |
| 2007/0113533 A1 * | 5/2007 | Schafer | A01F 29/10 |
| | | | 56/16.4 R |
| 2012/0185140 A1 | 7/2012 | Kormann et al. | |
| 2020/0029503 A1 | 1/2020 | Nielsen | |
| 2020/0128735 A1 | 4/2020 | Bonefas et al. | |
| 2021/0360856 A1 | 11/2021 | Fay, II | |
| 2021/0360857 A1 | 11/2021 | Steidinger et al. | |

FOREIGN PATENT DOCUMENTS

| | | |
|---|---|---|
| FR | 3071128 A3 | 3/2019 |
| WO | WO2019129334 A1 | 7/2019 |

* cited by examiner

HEADER CONDITIONING ROLL SYSTEM FOR AN AGRICULTURAL HARVESTING MACHINE

BACKGROUND OF THE INVENTION

Agricultural harvesting machines may include conditioners that crush, compress, tear, shred, or otherwise process crop material that is cut from the ground. For example, self-propelled windrowers or pull-type mower conditioners may include a conditioner in the form of two or more conditioning rolls that take in the crop material, condition it, and eject the conditioned crop material backwards along the vehicle's travel path (directly, or via a spreader or the like). Conditioners are used, for example, in processing hay, grass and other crop materials.

A typical self-propelled windrower includes a chassis, a prime mover, wheels, and a header. The header generally includes a cutter bar and a conditioner. The cutter bar can be a rotary cutter bar with rotating discs or a sickle-type cutter bar with reciprocating knives. A typical pull-type mower conditioner includes a frame, a hitch coupled to the towing vehicle, a cutter bar, and a conditioner mounted to the frame in a header-type manner. In either case, the equipment can also include other elements such as a reel to assist crop feeding, an auger or belts to convey crop to a central header inlet, a spreader to distribute the conditioned crop material, and so on.

The conditioner rolls are operated with a gap between them. The gap helps define the size of the crop mat that passes therethrough, and affects the overall results of the conditioning process. As the crop passes through the gap, the conditioning rolls apply opposing tangential forces that condition or otherwise crush the crop material. The extent of conditioning is based in part on the size of the gap and the tension holding the conditioning rolls in place to maintain the desired gap. The gap can also be opened to service the conditioner. For example, if the conditioner becomes plugged with crop material, the operator can exit the cab to manually release the conditioner roll tension and open the conditioner roll gap, and then operate the conditioning rolls in reverse to clear the plug. This can be a time-consuming and difficult process.

The inventors have determined that improvements can be made to conventional crop conditioners to improve the process of servicing the crop conditioner.

This description of the background is provided to assist with an understanding of the following explanations of exemplary embodiments, and is not an admission that any or all of this background information is necessarily prior art.

SUMMARY OF THE INVENTION

In a first aspect, there is provided an agricultural crop conditioner comprising: a frame; a first conditioner roll rotatably mounted to the frame; a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap; a tensioner operatively connected between the frame and the second conditioner roll, and configured to generate a contribution to a closing force to bias the second conditioner roll in the closing direction; a conditioner roll drive circuit comprising; and a hydraulic actuator. The conditioner roll drive circuit comprises: a hydraulic pump having a forward pump outlet and a reverse pump outlet, a hydraulic motor operatively connected at least one of the first conditioner roll and the second conditioner roll, and having a forward motor inlet and a reverse motor inlet, a forward supply line hydraulically connecting the forward pump outlet to the forward motor inlet, and a reverse supply line hydraulically connecting the reverse pump outlet to the reverse motor inlet. The hydraulic actuator is operatively connected between the frame and the second conditioner roll and has an actuator inlet operatively connected to the reverse supply line, wherein the hydraulic actuator is configured to convert pressure from hydraulic fluid in the reverse supply line into a contribution to an opening force to bias the second conditioner roll away from the first conditioner roll. The opening force is less than the closing force when the hydraulic pump is operated in a forward direction to move hydraulic fluid from the forward pump outlet to the forward motor inlet, and the opening force is greater than the closing force when the hydraulic pump is operated in a reverse direction to move hydraulic fluid from the reverse pump outlet to the reverse motor inlet.

In another aspect, there is provided an agricultural machine comprising: a chassis; one or more wheels configured to support the chassis for movement on a ground surface; and an agricultural crop conditioner mounted on the chassis and constructed according to the first aspect as described above.

In another aspect, there is a method for operating an agricultural crop conditioner according to the first aspect described above, the method comprising comprises: operating the hydraulic pump in the forward direction to rotate at least one of the first conditioner roll and the second conditioner roll in a forward processing direction to condition a flow of crop material moving in a downstream direction; and operating the hydraulic pump in the reverse direction to rotate at least one of the first conditioner roll and the second conditioner roll in a reverse processing direction to thereby move the second conditioner roll in the opening direction to increase the size of the gap, and move at least a portion of the flow of crop material in an upstream direction opposite the downstream direction.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide crop conditioning devices that may be used in agricultural equipment (e.g., mowers, windrowers, etc.), or in other environments. However, the invention is not limited to any particular application except as may be specifically recited in the claims.

The terms "forward," "rearward," "left" and "right," when used in connection with the agricultural harvester or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." The term "agricultural harvesting machine" may refer to any desired machine which cuts crop material from a field, such as a self-propelled windrower or a mower conditioner. The term "crop conditioning device" may refer to a roll-type conditioner that is usable in a self-propelled windrower, a pull-type mower conditioner, or any other desired machine.

As indicated above, the process for clearing a blocked conditioner roll system can be burdensome or time consuming, and the inventors have determined that this process can be improved. Exemplary systems and methods for improving this process (and improving conditioner roll systems in general) are described herein. Such improvements are described in relation to agricultural machines 100 such as those illustrated in FIGS. 1 and 2.

Figure 1:
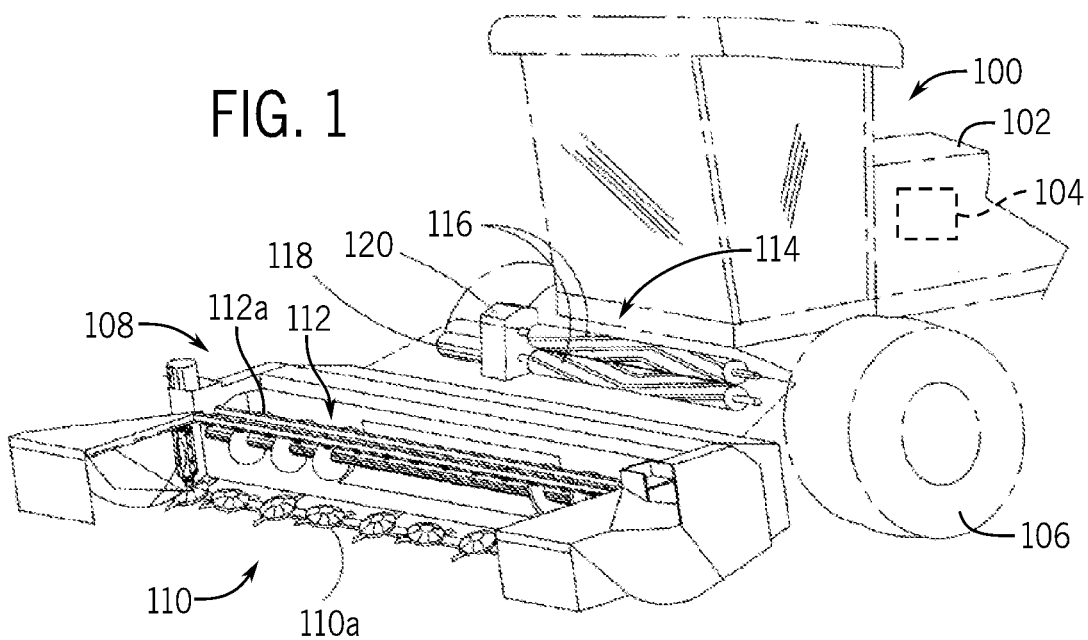
FIG. 1 illustrates an example of a self-propelled agricultural machine having header conditioning roll features such as described herein.

FIG. 1 illustrates a self-propelled agricultural machine 100. The machine 100 may be any type of machine that uses conditioner rolls, such as a mower conditioner, a windrower, or the like. In this case, the machine 100 comprises a self-propelled tractor, having a chassis 102, an engine 104, and powered wheels 106 (e.g., pneumatic tires, tracked wheels, etc.) that are driven by the engine 104 and configured to move the machine 100 across the ground.

A header 108 is attached to the chassis 102, either movably or in a fixed position. The header 108 is configured to process and/or direct crop material into a crop conditioner system 114 having two or more conditioner rolls 116. In this case, the header 108 has, at the forward end, a crop cutter 110 having cutting devices 110a such as one or more cutterbars, cutting discs, sickles, or the like, that are configured to sever standing crop material as the machine 100 moves forward along the ground. Behind the crop cutter 110 there may be belts or augers 112, to move the severed crop material towards the centerline of the header 108, or otherwise redistribute the severed crop material for introduction into the crop conditioner system 114. In other embodiments, one or both of the crop cutter 110 and collecting device may be omitted, or other features may be added. The crop conditioner system 114 is mounted behind the cutting device 110 and belts or augurs 112 to receive the incoming flow of cut crop material. The conditioner rolls 116 are driven by a motor 118 via a transmission 120 or other drive arrangement.

Figure 2:
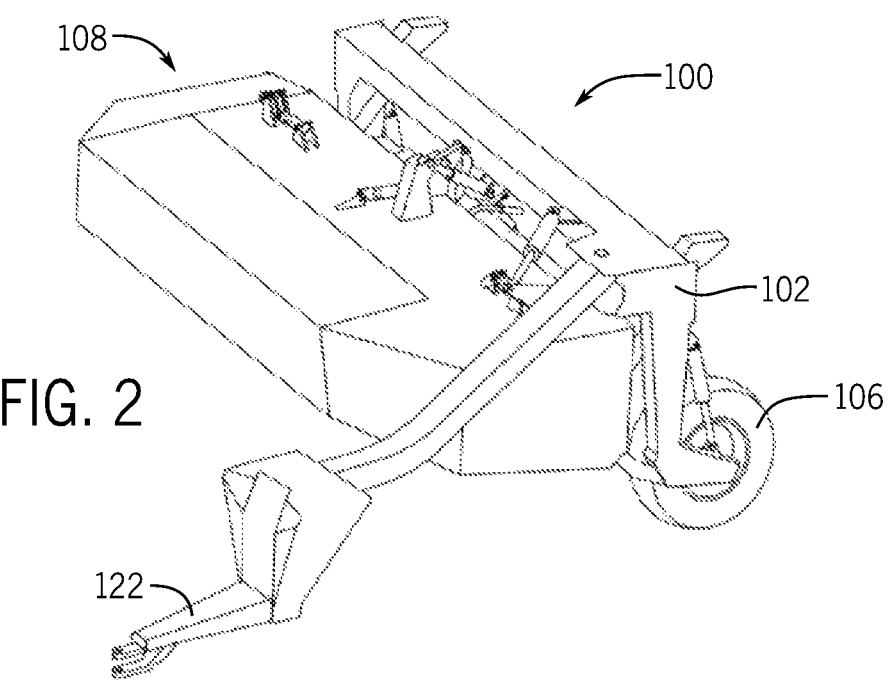
FIG. 2 illustrates an example of a towed agricultural machine having header conditioning roll features such as described herein.

FIG. 2 illustrates an agricultural machine 100 in the form of a pull-type mower conditioner. The pull-type mower conditioner 100 includes a chassis 102 that is supported on the ground by wheels 106, and pulled along the ground by a hitch 122 that connects to a separate tractor. The pull-type mower conditioner 100 also includes a header 108, which includes a crop conditioner system 114 as described in relation to FIG. 1 and may include other operating features.

Various conventional features of the foregoing agricultural machines 100 are omitted from the drawings and this description, but such details will be readily understood by persons of ordinary skill in the art and need no further explanation herein.

Figure 3:
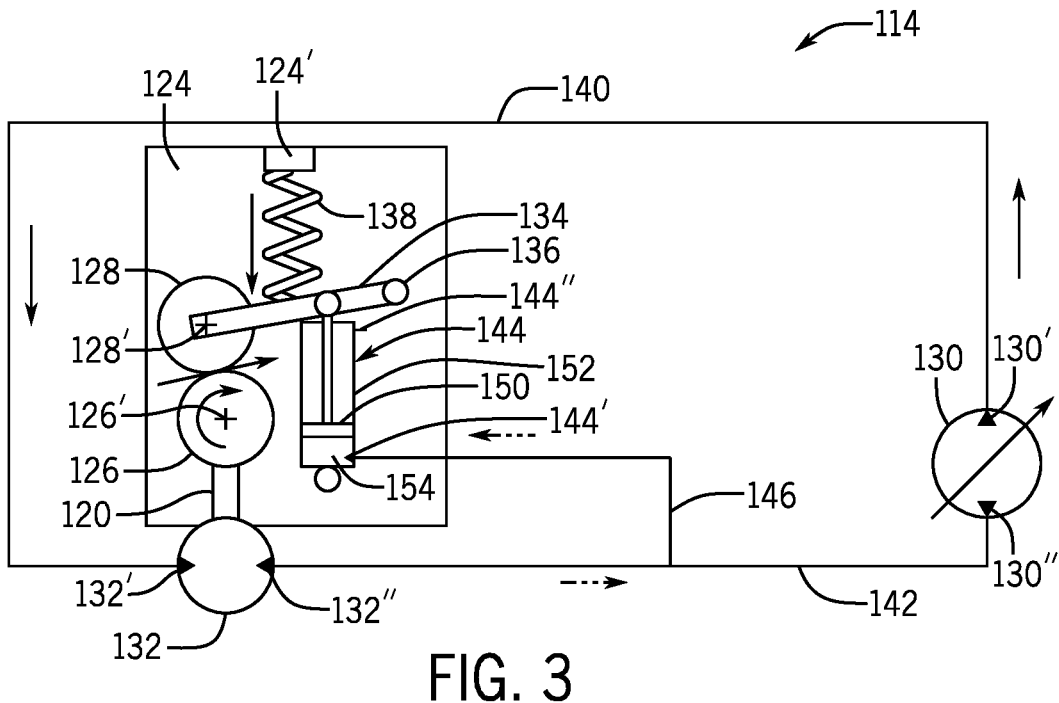
FIG. 3 schematically illustrates an example of a crop conditioning system operating in a forward-driving state.
Figure 4:
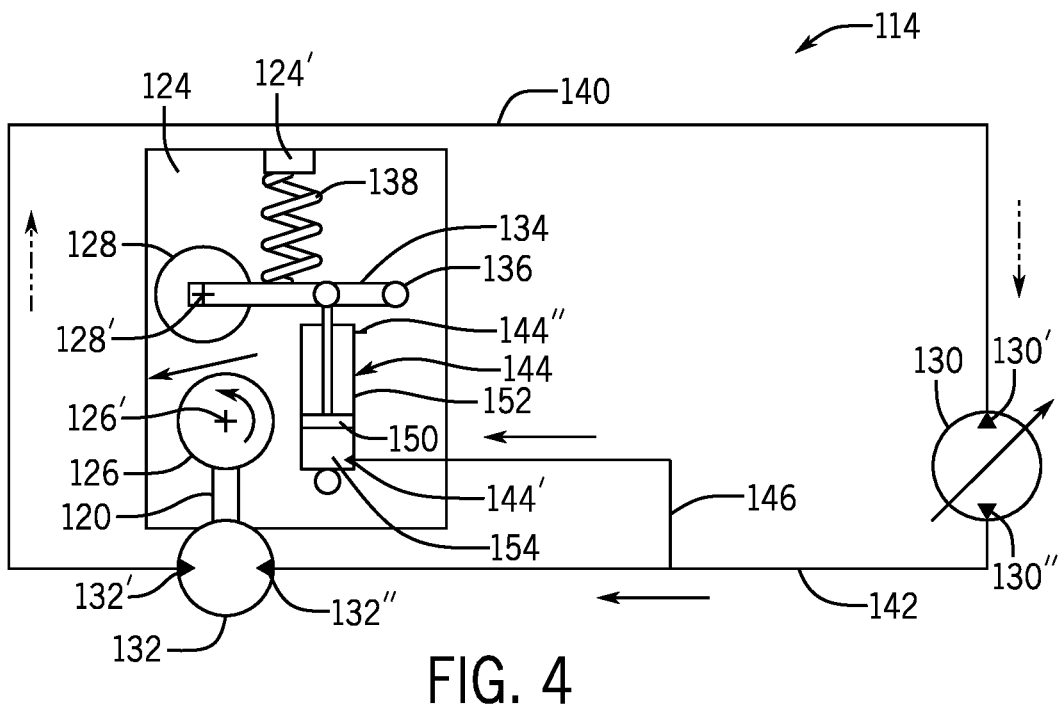
FIG. 4 schematically illustrates the crop conditioning system of FIG. 3, operating in a reverse-driving state.

FIGS. 3 and 4 schematically illustrate details of an exemplary crop conditioner system 114. The crop conditioner system 114 generally includes a frame 124, a first conditioner roll 126, a second conditioner roll 128, and a drive circuit having a hydraulic pump 130 and a hydraulic motor 132.

The frame 124 is mounted to, or defined as part of, the header 108. The first and second conditioner rolls 126, 128 are located adjacent to each other and both extend parallel to a common axis that extends perpendicular to the general direction of crop material processing flow. The first conditioner roll 126 is mounted to the frame 124 by bearings, bushings or the like, so as to be rotatable relative to the frame 124 about a first rotation axis 126'. Likewise, the second conditioner roll 128 is mounted to the frame by bearings, bushing or the like, so as to be rotatable relative to the frame 124 about a second rotation axis 128'. The first and second rotation axes 126', 128' are generally parallel to each other, and some variation in their relative orientation can be present by intent or by normal tolerance variations or wear.

The conditioner rolls 126, 128 may have any conventional or otherwise suitable construction for conditioning the crop material. For example, each conditioner roll 126, 128 may comprise a cylindrical body having raised herringbone surfaces that face each other to chop, crush, shear, or otherwise process the crop material. The conditioner rolls 126, 128 also may include intermeshing or gear-like surfaces. Two conditioner rolls 126, 128 are shown in the drawings, but additional conditioner rolls may be provided. Examples of conditioner rolls are shown in United States Patent Pre-Grant Publication Nos. US 2021/0360856 A1 and US 2021/0360857 A1, which are incorporated herein by reference for all purposes. Other alternatives and embodiments will be apparent to persons of ordinary skill in the art in view of the present disclosure.

The second conditioner roll 128 is also movable relative to the frame 124 to change its distance to the first conditioner roll 126. Such motion may be provided by, for example, mounting the second conditioner roll 128 to the frame 124 by a linkage including a rotatable arm 134 located at each end of the second conditioner roll 128. For simplicity, the rotatable arm 134 is shown as a simple single-bar linkage having a first end rotatably mounted directly to the frame 124 at an arm pivot 136, and a second end holding the second conditioner roll 128. However, the rotatable arm 134 may instead be provided as part of a multi-bar linkage or other types of moving mechanisms. In other cases, the second conditioner roll 128 may be movably mounted to the frame 124 on a sliding gantry or on sliding mounts that hold each end of the second conditioner roll and define a movement path (e.g., linear or curved) of the second conditioner roll 128. The first conditioner roll 126 also may be movable relative to the frame 124 in a manner similar to the second conditioner roll 128. Other alternatives and embodiments will be apparent to persons of ordinary skill in the art in view of the present disclosure.

Figure 5:
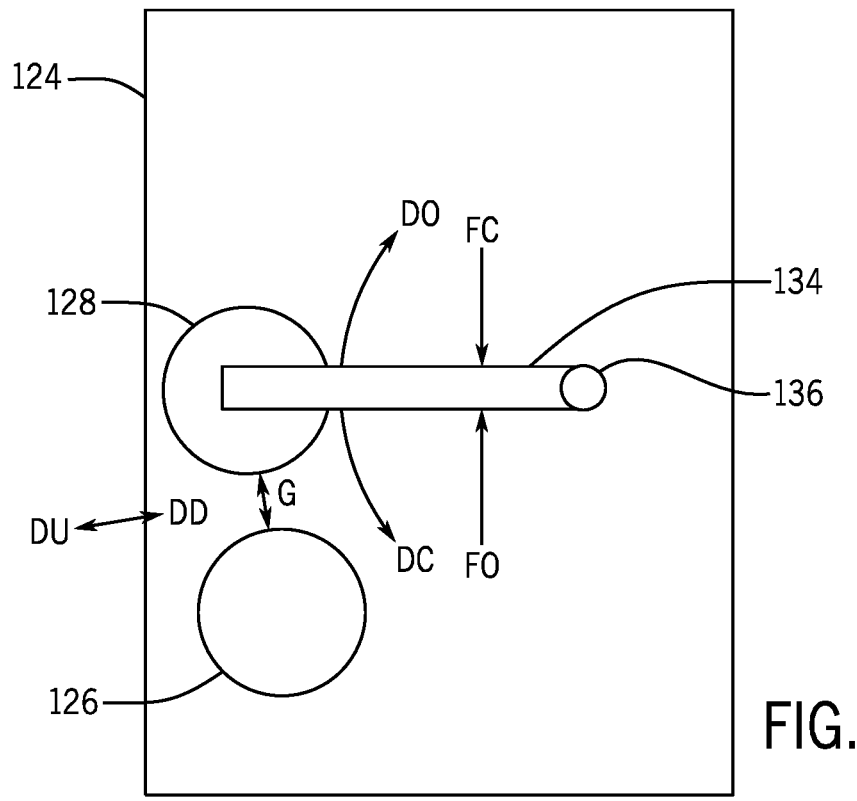
FIG. 5 is a schematic illustration of details of the embodiment of FIGS. 3 and 4, with features removed for clarity.

FIG. 5 shows the embodiment of FIGS. 3 and 4, with various features removed to facilitate a schematic illustration of the forces, movements and other aspects of the system. As shown in FIG. 5, the second conditioner roll 128 is movable relative to the frame 124 (e.g., by rotation of the link arm 134 about the pivot 136) in a closing direction DC to decrease a size of a gap G between the first conditioner roll 126 and the second conditioner roll 128, and an opening direction DO (opposite the closing direction DC) to increase the size of the gap G. The gap G defines the opening through which crop material is processed. A travel stop (not shown) may be included to limit the maximum size of the gap G. In normal operation, the crop material moves between the first and second conditioner rolls 126, 128 in a downstream processing direction DD, and in a reverse operation, the crop material moves between the first and second conditioner rolls 126, 128 in an upstream direction DU that is opposite the downstream direction DD.

The gap G may be measured in various ways. In the shown example, the gap G is a distance between the outermost radial surfaces of the first conditioner roll 126 and the second conditioner roll 128. The gap G could also be defined as a distance between the first and second rotation axes 126', 128', or in other ways. The manner in which the gap G is defined in a particular application is not relevant.

Referring back to FIGS. 3 and 4, a tensioner 138 is provided to generate a force that biases the second conditioner roll 128 in the closing direction DC. The total magnitude of forces that bias the conditioner roll 128 in the closing direction includes the force provided by the tensioner 138, as well as forces generated by gravity on the parts or by dynamic operation of the parts (e.g., driveline chain tension) and so on. For purposes of this explanation, the sum of these forces is referred to as the closing force FC.

The tensioner 138 may be any suitable or conventional device. Examples of tensioners in the form of hydraulically-positioned torsion bars attached to a conditioner roll by lever links are shown in United States Patent Pre-Grant Publication Nos. US 2021/0360856 A1 and US 2021/0360857 A1, which are incorporated herein by reference for all purposes. In these references, the tensioner 138 comprises a mechanical spring in the form of a torsion bar with a hydraulic preload actuator. In FIGS. 3 and 4, the tensioner 138 is a coil spring. Other mechanical springs, such as leaf springs, may be used on other cases. In still other cases, such as exemplified in FIG. 6, the tensioner 138 may comprise a pneumatic spring comprising a hydraulic actuator 138' having a gas-charged accumulator 138" to allow the hydraulic actuator 138' to resiliently reverse direction by compressing the gas in the accumulator 138". The tensioner 138 is operatively connected between the frame 124 and the second conditioner roll 128 by any suitable linkage, direct connection, or the like. Any operative connection in which the tensioner 138 applies its respective contribution to the closing force FC to the second conditioner roll 128 may be used. Examples of linkages are provided in the references identified immediately above. FIGS. 3 and 4 show the tensioner 138 connected to the frame 124 at a frame mount 124', and to the second conditioner roll 128 by way of the rotatable arm 134. The frame mount 124' optionally may be repositionable to vary the preload on the tensioner 138 and thus modulate the closing force FC. One or more tensioners 138 may be used. For example, a single tensioner 138 may be provided in the form of a torsion bar that connects to each end of the second conditioner roll 128 by linkages, or individual tensioners 138 may be provided at each end of the second conditioner roll 128. Other alternatives and embodiments will be apparent to persons of ordinary skill in the art in view of the present disclosure.

As noted above, the crop conditioner system 114 also includes a drive circuit having a hydraulic pump 130 and a hydraulic motor 132. The hydraulic pump 130 is connected to a source of hydraulic fluid (not shown) in a conventional manner, and may be driven by any suitable motive force. For example, the hydraulic pump 130 may be powered by an internal combustion engine (e.g., a dedicated engine or by a multi-purpose engine such as an engine 104 that also drives ground wheels 106), an electric motor, or the like. In some cases, the hydraulic pump 130 may be powered by a power take-off that is driven by the engine 104 via a transmission (e.g., a gearbox, drive chains and sprockets, etc.), or the hydraulic pump 130 may be driven by pressurized hydraulic fluid provided by a separate hydraulic pump that is powered by the engine 104. Other alternatives and embodiments will be apparent to persons of ordinary skill in the art in view of the present disclosure.

The hydraulic pump 130 has a forward pump outlet 130' and a reverse pump outlet 130". The hydraulic pump 130 is configured to generate a reversible flow of pressurized hydraulic fluid. The reversible flow may be provided in various ways. For example, a reversible flow may be provided by reversing the hydraulic pump's 130 rotation direction (e.g., via a reversing valve arrangement). As another example, a reversing valve may be used to redirect the output flow of a single-direction pump. As another example, a variable output mechanism such as a swashplate may be used to generate a reverse flow without necessarily changing the hydraulic pump's 130 rotation direction. As another example, two single-direction pumps may be provided to generate opposite flows with their output being regulated by flow control valves. For purposes of this disclosure, the exact construction of the hydraulic pump 130 is not important, and any suitable arrangement may be used to provide a reversible supply of pressurized fluid.

When operating in a forward flow direction, the hydraulic pump 130 expels high-pressure hydraulic fluid out of the forward pump outlet 130', and pulls low-pressure hydraulic fluid in though the reverse pump outlet 130". When operating in a reverse flow direction, the hydraulic pump 130 expels high-pressure hydraulic fluid out of the reverse pump outlet 130", and pulls low-pressure hydraulic fluid in though the forward pump outlet 130'. In either case, the pressure of the hydraulic fluid exiting the hydraulic pump 130 is greater than the pressure of the hydraulic fluid returning to the hydraulic pump 130. The relative pressures are schematically illustrated in the drawings by showing high pressure flow with solid line arrows, and low pressure flow with dashed line arrows.

The hydraulic motor 132 is operatively connected to one or more of the conditioner rolls 126, 128. For example, the hydraulic motor 132 may be directly connected to drive the first conditioner roll 126, and a separate hydraulic pump (not shown) may be provided to drive the second conditioner roll 128. As another example, the hydraulic motor 132 may be connected by a transmission (e.g., a gearbox, drive chains and sprockets, etc.) to both the first conditioner roll 126 and the second conditioner roll 128 to drive them in unison. Other alternatives and embodiments will be apparent to persons of ordinary skill in the art in view of the present disclosure.

The hydraulic motor 132 has a forward motor inlet 132' and a reverse motor inlet 132". A forward supply line 140 hydraulically connects the forward pump outlet 130' to the forward motor inlet 132', and a reverse supply line 142 hydraulically connects the reverse pump outlet 130" to the reverse motor inlet 132". The supply lines 140, 142 may comprise any suitable hydraulic fluid passage (flexible hoses, rigid conduits, etc.).

FIG. 3 shows the hydraulic pump 130 operating in the forward direction. In this state, high pressure hydraulic fluid moves through the forward supply line 140 from the forward pump outlet 130' to the forward motor inlet 132'. The high pressure hydraulic fluid drives the hydraulic motor 132 in the forward direction to thereby drive the first conditioner roll 126 in the forward direction as shown by the arrow. Low pressure hydraulic fluid moves through the reverse supply line 142 from the reverse pump inlet 132" to the reverse motor outlet 130".

FIG. 4 shows the hydraulic pump 130 operating in the reverse direction. In this state, high pressure hydraulic fluid moves through the reverse supply line 142 from the reverse pump outlet 130" to the reverse motor inlet 132". The high pressure hydraulic fluid drives the hydraulic motor 132 in the reverse direction to thereby drive the first conditioner roll 126 in the reverse direction as shown by the arrow. Low pressure hydraulic fluid moves through the forward supply line 140 from the forward motor inlet 132' to the forward pump outlet 130'.

The features described thus far are generally conventional or will be understood by the person of ordinary skill in the art without further explanation.

It has been found that a crop conditioning system 114 such as described above can be improved by adding one or more hydraulic actuators 144 that take advantage of hydraulic pressure from the reverse supply line 142 to apply at least part of an opening force FO to bias the second conditioner roll 128 towards the opening direction DO. Such a hydraulic actuator 144 can be used for various purposes, such as to open the gap G to facilitate evacuation of plugged crop material in the upstream direction while operating the conditioner rolls 126, 128 in reverse, contributing to control the amount of pressure (and thus the size of the gap G) between the conditioner rolls 126, 128, and opening the gap G for service while the machine is not operating.

Referring to FIGS. 3 and 4, in a first example at least one hydraulic actuator 144 is operatively connected between the frame 124 and the second conditioner roll 128. The hydraulic actuator 144 may be operatively connected to the rest of the system in any way that converts a force generated by hydraulic pressure in the hydraulic actuator 144 into a contribution to an opening force FO as described herein. In this case, the hydraulic actuator 144 is a single-acting linear actuator having a piston 150 that is telescopically movable within a cylinder 152 to define a variable-size chamber 154, and the piston 150 is connected to the rotatable arm 134, and the cylinder is connected to the frame 124, but other arrangements may be used. For example, a single-acting linear actuator may be replaced by a double-acting linear actuator or the outlet of a single-acting actuator may be hydraulically coupled to an accumulator or other system to develop a return force on the piston 150.

Figure 6:
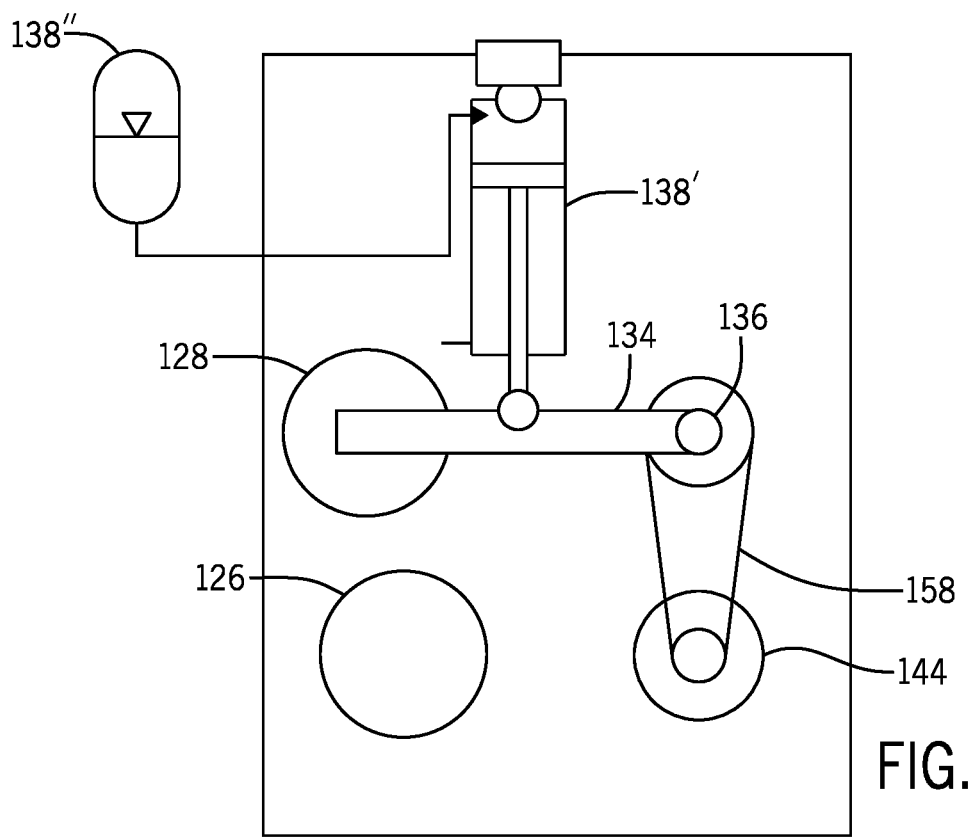
FIG. 6 is a schematic illustration of another embodiment of portions of a crop conditioning system.

The hydraulic actuator 144 has an actuator inlet 144' that is operatively connected to the reverse supply line 142 by a hydraulic passage 146, and an actuator outlet 144" that is vented to atmospheric pressure directly or via an unpressurized hydraulic reservoir. The hydraulic passage 146 may be any passage suitable to convey hydraulic fluid from the reverse supply line 142 to the actuator inlet 144', such as a flexible hose or rigid conduit. The hydraulic passage 146 may be uninterrupted (i.e., a passage that is always open), or it may include one or more valves 148 or other hydraulic controls, as explained below. While a linear actuator is preferred, other types of hydraulic actuator may be used in other embodiments. For example, FIG. 6 shows and embodiment having a rotary hydraulic actuator, such as a travel-limited unidirectional hydraulic motor or the like. The shown rotary hydraulic actuator 144 is attached to the rotatable arm 134 at the arm pivot 136 via a transmission 158 such as a chain and sprocket arrangement or the like. Other alternatives and embodiments will be apparent to persons of ordinary skill in the art in view of the present disclosure.

The actuator inlet 144' leads to a variable-volume piston chamber 154 in which pressurized hydraulic fluid acts on the piston 150 to generate a force to expand the piston 150 telescopically from the cylinder 152. The opposite side of the piston 150 is open to atmospheric pressure via the actuator outlet 144", so the hydraulic actuator 144 does not generate any significant force opposing the opening force FO. In operation, the hydraulic fluid within the variable-volume piston chamber 154 is maintained at essentially the same pressure as the hydraulic fluid passing between the hydraulic pump 130 and the hydraulic motor 132 (assuming any valve or the like in the hydraulic passage 146 is open). Thus, when the hydraulic pump 130 is operating in the forward direction to convey hydraulic fluid from the forward pump outlet 130' to the forward motor inlet 132', the hydraulic pressure in the piston chamber 154 is relatively low, and when the hydraulic pump 130 is operating in the reverse direction to convey hydraulic fluid from the reverse pump outlet 130" to the reverse motor inlet 132", the hydraulic pressure in the piston chamber 154 is relatively high.

The properties of the hydraulic actuator 144 (or actuators), such as the surface area of the piston 150, can be selected to control the magnitude of the opening force FO in relation to the magnitude of the hydraulic pressure. For example, increasing the diameter of the cylinder 152 increases the hydrostatic force on the piston 150, and thus increases the opening force FO for a given hydraulic pressure within the piston chamber 154. Such principles are well-known in the art of hydraulic system design, and need not be explained in further detail herein.

In use, the hydraulic actuator 144 generates at least a portion of an opening force FO (see FIG. 5) to bias the second conditioner roll 128 towards the opening direction DO, to thereby increase the size of the gap G. The total opening force FO may include additional contributing forces, such as gravitational force (if, for example, the second conditioner roll 128 is mounted below the first conditioner roll 126) and forces generated by springs and the like that are separate from the hydraulic actuator 144. Alternatively, the entire opening force FO may be generated by the hydraulic actuator 144 or actuators.

The hydraulic actuator 144 (or actuators) is selected to operate to open the gap G when the hydraulic pump 130 is operated in the reverse direction, and not open the gap G when the hydraulic pump 130 is operated in the forward direction. More specifically, the total opening force FO is less than the total closing force FC when the hydraulic pump 130 is operated in the forward direction, and the total opening force FO is greater than the total closing force FC when the hydraulic pump 130 is operated in the reverse direction. Thus, when the hydraulic pump 130 is operating in the reverse direction, hydraulic fluid moves from the reverse supply line 142 into the chamber 154, expands the chamber 154 to extend the piston 150, and moves the second conditioner roll 128 in the opening direction DO away from the first conditioner roll 126, and thereby increases the size of the gap G. As this happens, the conditioner rolls 126, 128, which are running in reverse, drive plugged crop material and the like in the upstream direction from the crop conditioner system 114.

The embodiment of FIGS. 3 and 4 has an uninterrupted hydraulic passage, and therefore the pressurized fluid in the reverse supply line 142 acts on the hydraulic actuator 144 even when the hydraulic pump 130 is operated in the forward direction. Thus, the opening force FO preferably is selected such that it does not overcome the closing force FC while the hydraulic pump 130 is operating in the forward direction.

The opening force FO also may be selected to account for variations in the closing force FC that may result from adjustments to the tensioner 138 and other changes to the system. For example, the tensioner 138 may be adjustable to change the closing force FC within a range between a minimum closing force value and a maximum closing force value. In such cases, the opening force FO may be selected to be less than the minimum closing force when the hydraulic pump 130 is operated in the forward direction, and greater than the maximum closing force when the hydraulic pump 130 is operated in the reverse direction. Thus, the hydraulic actuator 144 only applies a force sufficient to open the gap G when the hydraulic pump 130 is operated in reverse, regardless of any changes to the closing force FC caused by normal adjustments and system changes. Similarly, the opening force FO may vary within a range of values depending on changes in backpressure or other changes experienced by the hydraulic pump 130, and thus the range of values may be selected to meet the foregoing criteria of only opening the gap G during reverse operation of the hydraulic pump 130.

This arrangement is expected to provide significant operating benefits. First, when it is necessary to clear crop material plugs or other blockages, the crop conditioner system 114 can be operated to simultaneously open the gap G and drive the conditioner rolls 126, 128 in the reverse direction, simply by reversing the hydraulic pump 130. Upon doing so, the crop conditioner rolls 126, 128 can freely eject the crop material in the upstream direction DU. This improves conventional systems, in which the operator must leave the operating cab, manually relieve tension on the tensioner 138 to open the gap G, and then run the pump motor 130 in the reverse direction to clear the plug. Furthermore, the system requires few, and relatively inexpensive, additional parts, and can be retrofitted to existing crop conditioners without significant changes to the mechanical or hydraulic system. This system also opens the opportunity to easily periodically open the gap G and run the system in reverse, even when a plug is not present, to help forestall the accumulation of crop material that might lead to a plug. Other benefits and advantages are expected to be identified with further use.

Embodiments also may include other features and options to obtain additional benefits or alternative performance capabilities. On such option is adding one or more valves 148 to the hydraulic passage 146 joining the hydraulic actuator 144 to the reverse supply line 142.

Figures 7, 8:
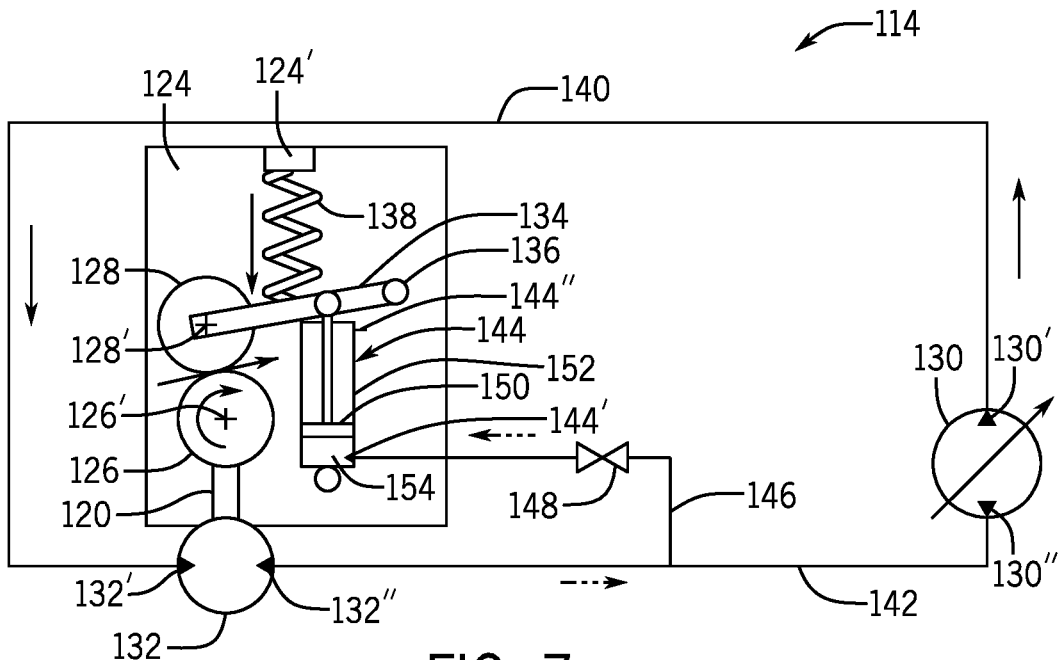
FIG. 7 schematically illustrates a another example of a crop conditioning system.
FIG. 8 schematically illustrates another example of a crop conditioning system.

FIG. 7 shows an example of a crop conditioner system 114 constructed as shown in FIGS. 3 and 4, but with a shutoff valve 148 located in the hydraulic passage 146. The shutoff valve is movable between an open condition in which the shutoff valve 148 hydrostatically connects the hydraulic actuator 144 to the reverse supply line 142, and a closed position in which the shutoff valve 148 hydrostatically disconnects the actuator 144 from the reverse supply line 142. In this case, the shutoff valve 148 isolates the hydraulic fluid within the actuator when the shutoff valve 148 is in the closed position, thereby locking the hydraulic actuator 144 in a fixed position when the shutoff valve 148 is closed.

A shutoff valve 148 such as shown in FIG. 7 can be used in various ways. For example, the shutoff valve 148 can be closed prior to turning on the hydraulic pump 130, or while the hydraulic pump 130 is operating the forward direction, to capture low-pressure hydraulic fluid in the cylinder 154 and prevent the hydraulic actuator 144 from operating at a high pressure when the hydraulic pump 130 is operated in the reverse direction. This turns off the automatic opening operation provided by the embodiment of FIGS. 3 and 4. A shutoff valve 148 also may be closed when the hydraulic pump 130 is operating in the forward direction to hold the second conditioner roll 128 in the opened position. This allows the crop conditioner system 114 to be operated in both the forward and reverse directions with the gap G opened to help evacuate crop material or other blockages in the upstream and downstream directions. This also allows the operator to turn off the hydraulic pump 130 and shut down the system with the gap opened G, in order to service the crop conditioner system 114 in the region of the gap G while the crop conditioner system 114 is not operating.

FIG. 8 shows an example of a crop conditioner system having a shutoff valve 148 with a bleed circuit 148'. The bleed circuit 148' is configured to vent the hydraulic actuator 144 from the actuator inlet 144' to a reservoir 156 or the like, when the shutoff valve 148 is in the closed position. Thus, when the shutoff valve 148 is closed, the closing force FC can freely reverse the hydraulic actuator 144, and the hydraulic actuator 144 generates no contribution to the opening force FO (and the opening force FO may be reduced to zero if it has no other contributors). This arrangement may be useful to allow the tensioner 138 to fully control the regulation of pressure applied between the second conditioner roll 128 and the first conditioner roll 126. The embodiment of FIG. 8 may be further modified to include other valve features. For example, the shutoff valve 148 may include a fully-closed valve position in which the bleed circuit 148' is disabled such that the system operates like the embodiment of FIG. 7.

In still other embodiments, the valve 148 also may comprise a pressure relief valve that can be used to regulate the hydraulic pressure in the hydraulic actuator 144, to thereby regulate the opening force FO.

In any of the foregoing embodiments, the valve 148 or valves may be configured to be controlled manually by the operator at the valve or by a remote control. The valves 148 also may be configured to be controlled automatically by a suitable control system (not shown). Additionally, while the foregoing examples schematically show valves 148 located in the hydraulic passage 146 at a location separate from the hydraulic actuator 144, it will be understood that the valve 148 may be located at any location at which it controls the hydrostatic connection between the hydraulic actuator 144 and the reverse supply line. For example, a valve 148 may be integrated into the body of the hydraulic actuator 144. Other alternatives and embodiments will be apparent to persons of ordinary skill in the art in view of the present disclosure.

The present disclosure describes a number of inventive features and/or combinations of features that may be used alone or in combination with each other or in combination with other technologies. Such features may be used in any useful combination, and the appearance of a particular feature in combination with another particular feature in the embodiments is not intended to suggest that such features cannot be used in alternative combinations with other features. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. Also, features identified in the singular or by a specific number are not intended to be limited to a single features or the described number of features unless specifically recited as being present only in the specified quantity.

The invention claimed is:

1. An agricultural crop conditioner comprising:
   a frame;
   a first conditioner roll rotatably mounted to the frame;
   a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap;
   a tensioner operatively connected between the frame and the second conditioner roll, and configured to generate a contribution to a closing force to bias the second conditioner roll in the closing direction;
   a conditioner roll drive circuit comprising:
      a hydraulic pump having a forward pump outlet and a reverse pump outlet,
      a hydraulic motor operatively connected at least one of the first conditioner roll and the second conditioner roll, and having a forward motor inlet and a reverse motor inlet,
      a forward supply line hydraulically connecting the forward pump outlet to the forward motor inlet, and
      a reverse supply line hydraulically connecting the reverse pump outlet to the reverse motor inlet; and
   a hydraulic actuator operatively connected between the frame and the second conditioner roll and having an actuator inlet operatively connected to the reverse supply line, wherein the hydraulic actuator is configured to convert pressure from hydraulic fluid in the reverse supply line into a contribution to an opening force to bias the second conditioner roll away from the first conditioner roll;
   wherein the opening force is less than the closing force when the hydraulic pump is operated in a forward direction to move hydraulic fluid from the forward pump outlet to the forward motor inlet, and the opening force is greater than the closing force when the hydraulic pump is operated in a reverse direction to move hydraulic fluid from the reverse pump outlet to the reverse motor inlet.

2. The agricultural crop conditioner of claim 1, wherein at least a portion of the closing force comprises a gravitational force on at least the second conditioner roll.

3. The agricultural crop conditioner of claim 1, wherein the hydraulic actuator comprises one or more single-acting hydraulic linear actuators.

4. The agricultural crop conditioner of claim 1, wherein the hydraulic actuator comprises one or more double-acting hydraulic actuators.

5. The agricultural crop conditioner of claim 1, wherein the hydraulic actuator comprises one or more rotary actuators.

6. The agricultural crop conditioner of claim 1, wherein the tensioner comprises at least one spring.

7. The agricultural crop conditioner of claim 6, wherein the tensioner comprises at least one mechanical spring or pneumatic spring.

8. The agricultural crop conditioner of claim 1, wherein the closing force is variable upon adjustment of the tensioner, between a minimum closing force and a maximum closing force, and the opening force is less than the minimum closing force when the hydraulic pump is operated in the forward direction, and the opening force is greater than the maximum closing force when the hydraulic pump is operated in the reverse direction.

9. The agricultural crop conditioner of claim 1, wherein the actuator inlet is operatively connected to the reverse supply line by an uninterrupted hydraulic passage.

10. The agricultural crop conditioner of claim 1, further comprising one or more valves operatively connected to the hydraulic actuator to control the operation of the hydraulic actuator.

11. The agricultural crop conditioner of claim 10, wherein the one or more valves comprise a shutoff valve that is movable between an open condition in which the shutoff valve hydrostatically connects the hydraulic actuator to the reverse supply line, and a closed position in which the shutoff valve hydrostatically disconnects the actuator from the reverse supply line.

12. The agricultural crop conditioner of claim 11, wherein the shutoff valve comprises a bleed circuit configured to vent the hydraulic actuator from the actuator inlet when the shutoff valve is in the closed position.

13. An agricultural machine comprising:
   a chassis;
   one or more wheels configured to support the chassis for movement on a ground surface; and
   an agricultural crop conditioner mounted on the chassis and comprising:
      a frame;
      a first conditioner roll rotatably mounted to the frame;
      a second conditioner roll rotatably mounted to the frame and extending parallel to and alongside the first conditioner roll, wherein the second conditioner roll is movable relative to the frame in a closing direction to decrease a size of a gap between the first conditioner roll and the second conditioner roll, and an opening direction to increase the size of the gap;
      a tensioner operatively connected between the frame and the second conditioner roll, and configured to generate a contribution to a closing force to bias the second conditioner roll in the closing direction;
      a conditioner roll drive circuit comprising:
         a hydraulic pump having a forward pump outlet and a reverse pump outlet, a hydraulic motor operatively connected at least one of the first conditioner roll and the second conditioner roll, and having a forward motor inlet and a reverse motor inlet, a forward supply line hydraulically connecting the forward pump outlet to the forward motor inlet, and a reverse supply line hydraulically connecting the reverse pump outlet to the reverse motor inlet; and a hydraulic actuator operatively connected between the frame and the second conditioner roll and having an actuator inlet operatively connected to the reverse supply line, wherein the hydraulic actuator is configured to convert pressure from hydraulic fluid in the reverse supply line into a contribution to an opening force to bias the second conditioner roll away from the first conditioner roll;

wherein the opening force is less than the closing force when the hydraulic pump is operated in a forward direction to move hydraulic fluid from the forward pump outlet to the forward motor inlet, and the opening force is greater than the closing force when the hydraulic pump is operated in a reverse direction to move hydraulic fluid from the reverse pump outlet to the reverse motor inlet.

14. The agricultural machine of claim 13, further comprising a motor supported on the chassis and configured to drive the wheels to move the chassis along the ground.

15. A method for operating an agricultural crop conditioner comprising:

a frame;

a first conditioner roll rotatably mounted to the frame;

a second conditioner roll rotatably mounted to the frame and extending parallel to and alongside the first conditioner roll, wherein the second conditioner roll is movable relative to the frame in a closing direction to decrease a size of a gap between the first conditioner roll and the second conditioner roll, and an opening direction to increase the size of the gap;

a tensioner operatively connected between the frame and the second conditioner roll, and configured to generate a contribution to a closing force to bias the second conditioner roll in the closing direction;

a conditioner roll drive circuit comprising:

a hydraulic pump having a forward pump outlet and a reverse pump outlet, a hydraulic motor operatively connected at least one of the first conditioner roll and the second conditioner roll, and having a forward motor inlet and a reverse motor inlet, a forward supply line hydraulically connecting the forward pump outlet to the forward motor inlet, and a reverse supply line hydraulically connecting the reverse pump outlet to the reverse motor inlet; and a hydraulic actuator operatively connected between the frame and the second conditioner roll and having an actuator inlet operatively connected to the reverse supply line, wherein the hydraulic actuator is configured to convert pressure from hydraulic fluid in the reverse supply line into a contribution to an opening force to bias the second conditioner roll away from the first conditioner roll;

wherein the opening force is less than the closing force when the hydraulic pump is operated in a forward direction to move hydraulic fluid from the forward pump outlet to the forward motor inlet, and the opening force is greater than the closing force when the hydraulic pump is operated in a reverse direction to move hydraulic fluid from the reverse pump outlet to the reverse motor inlet;

wherein the method comprises:

operating the hydraulic pump in the forward direction to rotate at least one of the first conditioner roll and the second conditioner roll in a forward processing direction to condition a flow of crop material moving in a downstream direction; and operating the hydraulic pump in the reverse direction to rotate at least one of the first conditioner roll and the second conditioner roll in a reverse processing direction to thereby move the second conditioner roll in the opening direction to increase the size of the gap, and move at least a portion of the flow of crop material in an upstream direction opposite the downstream direction.

* * * * *